Figure 1:
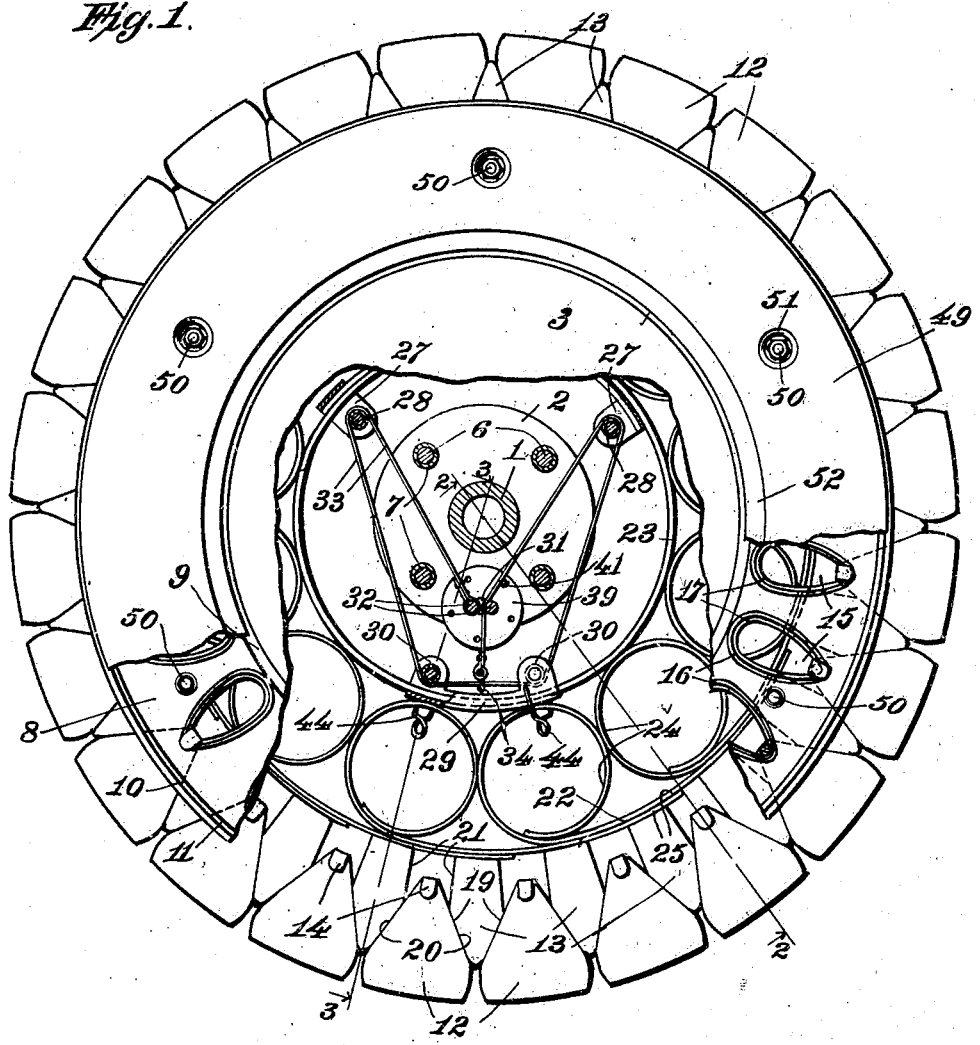

April 8, 1930.  L. P. MILLER  1,753,527
RESILIENT WHEEL
Filed Aug. 1, 1927   3 Sheets-Sheet 1

Inventor
Lawrence P. Miller,
By Joshua R. H. Potts
Attorney

April 8, 1930.  L. P. MILLER  1,753,527
RESILIENT WHEEL
Filed Aug. 1, 1927   3 Sheets-Sheet 2
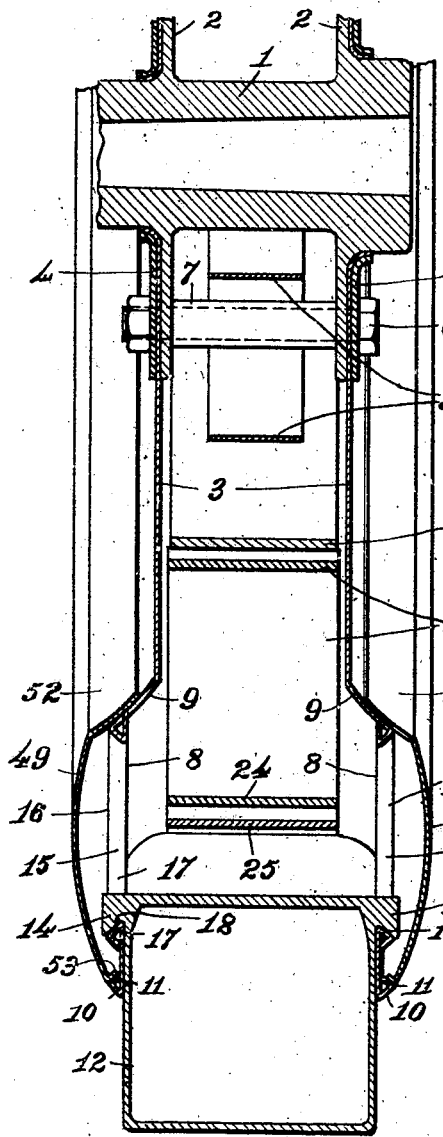
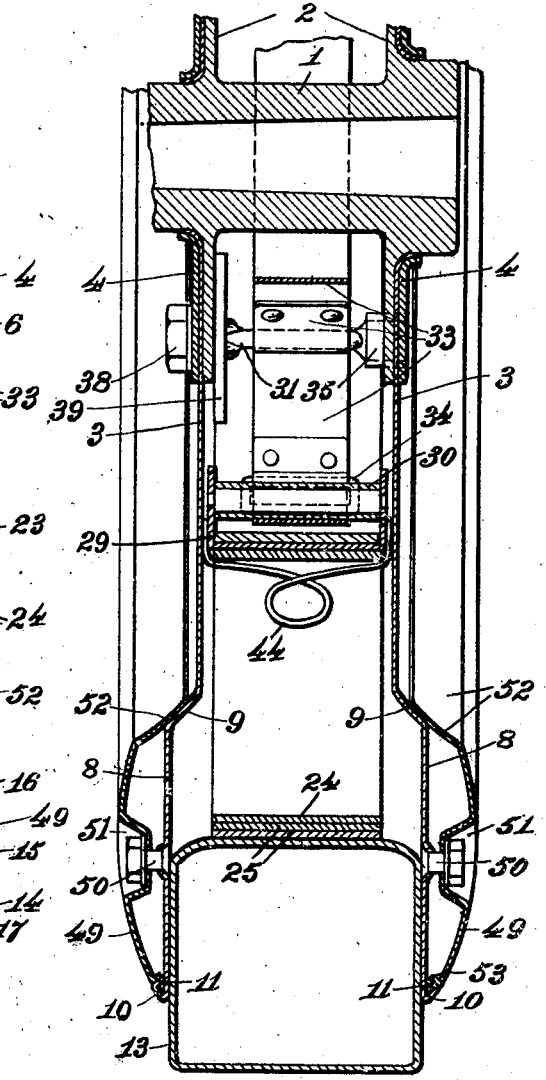
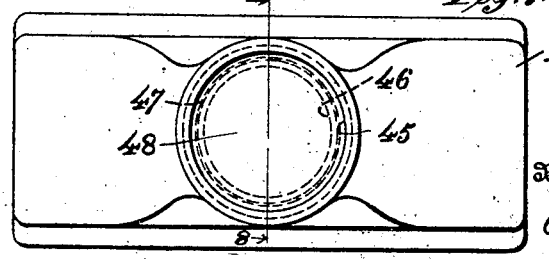
Inventor
Lawrence P. Miller
By Joshua R. H. Potts
Attorney April 8, 1930.                L. P. MILLER                1,753,527
                              RESILIENT WHEEL
                      Filed Aug. 1, 1927      3 Sheets-Sheet 3
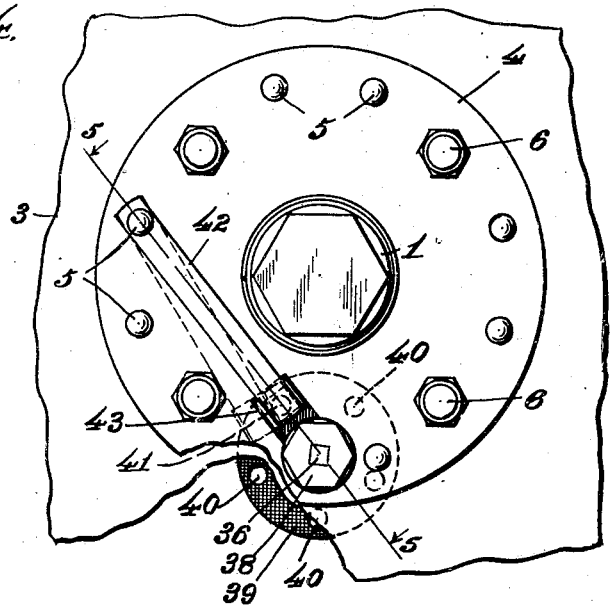
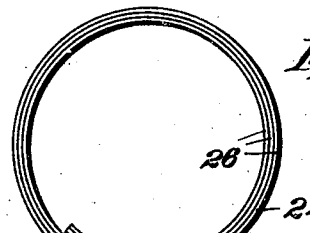
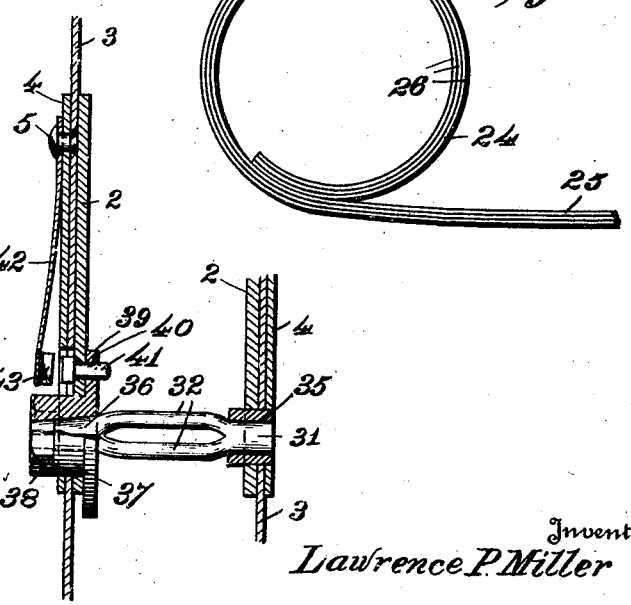
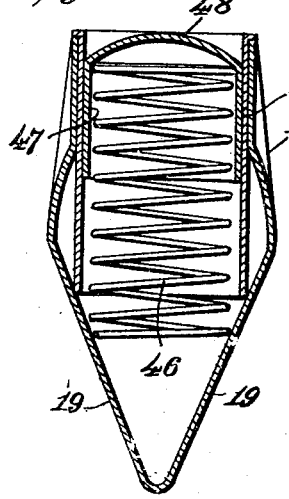
Inventor
Lawrence P. Miller
By Joshua R. H. Potts
Attorney Patented Apr. 8, 1930

1,753,527

UNITED STATES PATENT OFFICE

LAWRENCE PAXTON MILLER, OF PHILADELPHIA, PENNSYLVANIA

RESILIENT WHEEL

Application filed August 1, 1927. Serial No. 209,736.

My invention relates to resilient wheels and particularly to that class thereof having deformable treads such as disclosed in my Patent No. 1,640,613, the application for which, Serial No. 169,846, was filed February 21, 1927. The wheel under consideration consists generally in a pair of spaced disks secured to a suitable hub and having a tread formed of a plurality of alternately arranged wedge members arranged between the peripheries of the disks and projecting beyond the same, in combination with means for yieldingly forcing the tread block outwardly, said means consisting generally in an annular series of spring elements interposed between the inner ends of the inner wedge blocks and a combined retaining and tension device.

The object of my invention is to provide in a wheel of the character under consideration, an improved construction whereby the same will have a uniform radial resistance throughout its periphery. A further object of my invention is to provide in a wheel as mentioned, a construction whereby the portions of the spring units which are subjected to the greatest movement shall stand clear of the side disks. A further object of my invention is to provide in a wheel of the class mentioned, means whereby the spring units are prevented from relative rotation so as to maintain them in their proper relation to each other and to the other elements of the device. A further object of my invention is to provide means to prevent creeping of the spring elements circumferentially. A further object of my invention is to provide in a wheel as mentioned a construction whereby the resiliency of the spring units may be varied. A further object of my invention is to provide in a wheel of the class mentioned a tension regulating device for regulating the degree of resiliency of the wheel, and which will vary the tension uniformly throughout the circumference of the wheel. A further object of my invention is to provide, in a wheel having a periphery consisting of opposed wedge members with springs for forcing the same outwardly, a construction whereby only a fraction of the radial movement of the tread blocks will be imparted to the spring elements. A further object of my invention is to provide a wheel of such construction that it will readily work itself out of mud or mire instead of digging itself in as is common with ordinary traction wheels. Other objects will appear hereinafter.

With these objects in view my invention consists generally in a wheel comprising a pair of disks fixed to a suitable hub, a tread formed of a plurality of alternately arranged wedge blocks arranged between the outer edges of said disks and projecting beyond the same, a flexible ring engaging the inner ends of said blocks and inner tension rings and a series of circular split spring rings interposed between said flexible rings and said tension ring. My invention further consists in a device as mentioned in which the flexible ring which engages the inner ends of the blocks is formed of overlapping sections. My invention further consists in a device as mentioned in which each of the said split spring rings is formed integrally with one of the flexible ring sections, whereby resiliency is imparted to said flexible ring, and whereby rotation of the circular split rings is prevented. My invention further consists in an improved adjusting mechanism for the inner tension ring whereby uniform resiliency is maintained throughout the periphery of the device at all adjustments. My invention further consists in a wheel as mentioned in which each of the outer tread blocks is provided with lugs for limiting the outward movement thereof, the disks being formed with suitably radially disposed apertures to receive the lugs, and annular cover plates enclosing the apertured portion of the disk to exclude foreign matter and improve the appearance of the wheel. My invention further consists in a device as mentioned in which the peripheral portions of the disks adjacent the tread blocks and outer portions of the spring members are spaced from the plane of the body portions of the disk, thereby increasing the width of the tread of the wheel and also maintaining the portions of the spring rings subjected to the greatest movement out of contact with the disks. My invention further consists in various details of construction and arrangements of parts all as will be fully described hereinafter and particularly pointed out in the claims.

My invention will be more readily understood by reference to the accompanying drawings forming a part of this specification and in which—

Figure 1 is a side elevation of a wheel embodying my invention, portions being broken away to illustrate the construction.

Fig. 2 is a section on the line 2—2 of Fig. 1, illustrated upon an enlarged scale, Fig. 3 is a similar sectional view on the line 3—3 of Fig. 1, Fig. 4 is a detail elevational view of the outer face of the wheel at the hub, illustrating a portion of the tension adjusting device, Fig. 5 is a sectional view on the line 5—5 of Fig. 4, the lock pin retaining spring being lifted, Fig. 6 is an elevation of a portion of a modified form of one of the spring elements, Fig. 7 is a plan view of a modified form of one of the inner wedge blocks, illustrated upon a further enlarged scale, and Fig. 8 is a section on the line 8—8 of Fig. 7.

Referring now to the drawings 1 indicates a hub of a wheel preferably formed with a pair of integral flanges 2—2 to which are secured disks 3—3 forming the web of the wheel. The inner edges of the disks 3 are reinforced by annular plates 4, riveted thereto as indicated at 5. The reinforced edges of the disks are secured to the hubs by bolts 6. These bolts extend through the reinforced edges of both disks and the corresponding flanges 2, and a spacing sleeve 7 is provided on the bolt between the flanges 2. Disks 3 are formed with outwardly offset portions 8 connected to the body portions 3 by inclined annular portions 9, for a purpose hereinafter described. The peripheral edges of the disk are formed with annular beads 10 presenting inwardly inclined faces 11.

Arranged between the peripheries of the disks and projecting beyond the same, is a series of alternately arranged wedge blocks 12 and 13, the outer tread blocks 12 are inwardly tapered and at their inner ends are formed with laterally projecting lugs 14 which engage in substantially radially disposed apertures 15 formed in the portions 8 of the disks. The apertures 15 are preferably oval to permit a limited peripheral movement of the lugs 14 as well as radial movement, but the outer ends of the sides converge to form a definite seat for the lugs. The edges of the oval apertures are formed with reinforcing beads 16 presenting inwardly beveled faces 17, and the underfaces of the lugs 14 are undercut as at 18 to engage said faces. This not only forms a seat for properly positioning the outer blocks 12, when the blocks are not displaced by pressure, but also provides a construction whereby the lugs of the normally positioned blocks 12 will tend to prevent spreading of the peripheries of the disks.

The blocks 13 are outwardly tapered forming inclined walls 19 which frictionally engages the inwardly inclined walls 20 of the blocks 12. At their inner ends the edges of the blocks are cut away as indicated at 21 to prevent interference of said blocks with each other when subjected to excessive inward movement. It will be noted that the blocks 13 extend inwardly beyond the inner ends of the blocks 12. By this construction only a portion of the inward movement of the blocks 12 is imparted to the spring members as, when a block 12 moves inwardly, it does not itself engage the spring elements but compresses the same only through the adjacent blocks 13. These, due to movement on the inclined faces 20, move inwardly only a fraction of the distance that the blocks 12 move.

Means are provided for yieldably forcing the blocks outwardly. This comprises an outer flexible ring 22, an inner tension ring 23, and a series of split spring rings interposed between the same. In order to give greater and more uniform flexibility and resiliency to the device, the outer ring 22 is formed of a plurality of overlapping sections 25 each of which is of sufficient length to overlie a plurality of blocks 13. In practice I prefer to form each of the split rings 24 integral with one of the ring sections 25 and have so illustrated it in the drawings. To this end, one of the ends of the split ring 24 terminates in the elongated extension 25, which constitutes one of the outer ring sections. The rings 24 are arranged in engagement with each other and this maintains the sections 25 in proper relation to each other; and the extension sections 25 prevent rotation of the rings 24. In order to vary the resiliency of this portion of the device each of the ring members 24—25 may be formed of a plurality of similarly nested members 26, as illustrated in Fig. 6 of the drawings. This provides a construction whereby it is only necessary to manufacture a single gauge and grade of spring members 24—25 as in assembling this portion of the wheel it may be varied to suit the weight of the vehicle with which the wheel is to be used by merely nesting a sufficient number of said members.

The blocks 12 and 13 are slidably mounted between the offset portions 8 of the disks, and the outer portions of the springs 24—25 extend into this offset portion. By this arrangement the portions of the springs which are subjected to the greatest movement are positioned so that they cannot come in contact with the disks, thereby avoiding friction with its resulting wear and noise.

Impinging against the rings 24 is the inner tension ring 23. This is a split ring of sufficient resiliency to exert the desired tension upon the springs 24; and is equipped with improved means for varying the tension thereof. To this end, the ends of the ring are overlapped a considerable distance and each end is equipped with a yoke 27 carrying a guide, preferably in the form of an anti-friction roller 28. On the ring 23, approximately midway between the yokes 27, is a yoke 29 having a pair of spaced guides 30, also preferably anti-friction rollers. Rotatably mounted adjacent the hub is an arbor 31, which is longitudinally split, forming a pair of parallel arms 32. One end of a non-elastic flexible band 33 is fixed to one of the parallel arms 32, passes over one of the guide rollers 28, over the two guide rollers 30, then over the other guide roller 28, and then through the space between the arms 32 of the arbor and connected to a link 34 engaging about the member 33 between the guide rollers 30. Rotation of the arbor will contract or permit expansion of the ring 23 to vary the tension as desired. One end of the arbor 31 is mounted in suitable bearings 35 while the other end is preferably squared as at 36 and fits within a rotary head 37. The head 37 is formed with a wrench hold 38 and an annular flange 39 having a series of apertures 40. 41 indicates a lock pin extending through the adjacent portion of the wheel and adapted to engage in one of the apertures 40 to hold the tensioning device in adjusted position. 42 indicates a lock pin retaining spring provided with jaws 43 to engage the head of the lock pin to hold the pin in operative position. The spring 42 may be attached to the device by one of the rivets 5 and may be turned to one side as indicated in dotted lines in Fig. 4 when it is desired to remove the pin 41 for readjusting the ring 23. 44 indicates spring clips fixed to the yoke 29 and engaging the adjacent rings 24 to prevent the rings from creeping.

Sometimes, should one of the blocks 12 be forced inwardly to an excessive degree as by coming in contact with a large pointed stone, the member 22 may be slightly lifted from the ends of the nearby blocks 13, which have not been moved out of position by the general flexing of the tread. To retain these blocks in their proper positions at such times thereby maintaining a uniform resiliency of the wheel and avoiding unnecessary noise, the inner blocks may be constructed as illustrated in Figs. 7 and 8 of the drawings. As shown therein, each block is provided with a centrally disposed recess 45 to receive a quick acting spring 46 and a telescoping plunger 47, preferably having a rounded head 48 to engage the members 22. Should, at any time, the members 22 be lifted from the ends of the block 13 the plunger 47 will follow the members 22, remain in contact therewith, and prevent displacement and undue noises.

In order to cover the apertures 15 and prevent foreign matter from entering the wheel through the same, I provide suitable annular cover plates 49 which are held in place by bolts 50, the heads of which are countersunk in the portions 8 of the disks. To form a smooth outer surface to the wheel, the cover plates 49 are countersunk as at 51 to receive the nuts of the bolts 50. These cover plates are arched in cross section and are formed with inner flanges 52 adapted to snugly engage the inclined portions 9 of the disks, and with outer peripheral edges 53 which engage the inclined faces 11 of the beads 10. It is obvious that by tightening the bolts 50 the cover plates 49 will make a secure and tight connection with the wheel disks.

I claim:

1. A wheel comprising a pair of disks, a plurality of oppositely disposed wedge shaped blocks arranged between the outer edges of said disks and forming a deformable tread, a flexible ring engaging the inner ends of said blocks, a tension ring and a series of split rings interposed between said flexible ring and said tension ring, said flexible ring being formed of integral extensions of said split rings and freely slidable one on the other, substantially as described.

2. A wheel comprising a pair of disks, a series of alternately arranged wedge blocks arranged between the edges of said disks and forming a deformable tread, an inner tension ring, a plurality of split rings surrounding said tension ring, the outer ends of said split rings being formed with extensions together constituting a flexible ring impinging against the inner ends of said blocks, and the extensions on the split rings being freely slidable one on the other and of sufficient length to extend across a plurality of blocks and to overlap the extension of the next adjacent ring, substantially as described.

3. A wheel comprising a pair of disks, a series of alternately arranged movable blocks between the outer edges of said disks, the inwardly tapered blocks being provided with lugs, said disks being provided with substantially radially disposed oval apertures to receive said lugs and permit limited peripheral movement as well as radial movement, and means for exerting yielding pressure on said blocks, substantially as described.

4. A device as set forth in claim 3 in which the edges of said ovel walls are provided with beads, and in which the lugs on the inwardly tapered blocks are undercut to engage said beads, substantially as described.

5. A device as set forth in claim 3 in combination with annular cover plates on said disks for covering said slots, substantially as described.

6. A wheel comprising a pair of disks, the outer peripheral portions being laterally offset, a series of oppositely disposed wedge shaped blocks arranged between the offset portions of said disks, certain of said blocks being provided with laterally extending lugs and the adjacent portions of the disks being provided with substantially radially disposed oval apertures to receive the lugs and permit limited peripheral movement as well as radial movement and means exerting yielding pressure on said blocks, substantially as described.

7. A wheel comprising a pair of disks, a series of alternately arranged wedge shaped blocks arranged between the peripheries of said disks, means limiting the outward movement of said blocks, a flexible ring exerting yielding pressure on the inner ends of said blocks and certain of said blocks being provided with spring pressed plungers adapted to engage said ring, substantially as described.

8. A wheel comprising a pair of disks a series of alternately arranged wedge shaped blocks arranged between the peripheries of said disks and forming a deformable tread and means for exerting yielding pressure on said blocks, said means including split tension ring, yokes on the ends of said tension ring and a yoke on said tension ring at substantially midway between the yokes on the ends thereof, said yokes being provided with guides, an arbor, a single flexible member threaded through the guides on said yokes and connected to said arbor and means for retaining said arbor in adjusted position, substantially as described.

9. A device as set forth in claim 8 in which the arbor is provided with a wrench hold and a perforated disk, and a retaining pin adapted to engage in a perforation in said disk to hold the device in adjusted position, substantially as described.

In testimony whereof I have signed my name to this specification.

LAWRENCE PAXTON MILLER.